Aug. 24, 1965  V. C. REES  3,202,377
CONSTANT TENSIONING PACKAGING SYSTEM
Filed June 29, 1962  2 Sheets-Sheet 1

INVENTOR.
VERNON C. REES
BY
Staelin & Overman
ATTORNEYS

Aug. 24, 1965  V. C. REES  3,202,377
CONSTANT TENSIONING PACKAGING SYSTEM
Filed June 29, 1962  2 Sheets-Sheet 2

INVENTOR.
VERNON C. REES
BY
Staelin & Overman
ATTORNEYS

United States Patent Office 3,202,377
Patented Aug. 24, 1965

3,202,377
CONSTANT TENSIONING PACKAGING SYSTEM
Vernon C. Rees, Newark, Ohio, assignor to Owens-Corning Fiberglas Corporation, a corporation of Delaware
Filed June 29, 1962, Ser. No. 206,226
3 Claims. (Cl. 242—75.5)

The present invention relates generally to winding and reeling apparatus and more particularly to a system for maintaining a constant peripheral speed of a cylindrical package as the package build-up occurs.

In forming cylindrical packages of draftable and wrinkleable material, such as bonded glass fiber mat, the speed of the mandrel on which the material is being wrapped must be modified as the package build-up occurs. As the radius of the package increases, the peripheral speed likewise increases at constant rate of rotation and if the rate of rotation of the packaging machine were not modified, the material being packaged would be pulled with an increasingly greater force tending to stretch, wrinkle, compress or otherwise distort the material.

It is, therefore, an object of this invention to provide a simple and inexpensive system for continuously varying or modifying the rate of rotation of a roll-up package machine to provide a substantially constant peripheral speed and to avoid undue stretching, wrinkling, compressing or otherwise distorting of the material being packaged.

The method of the invention comprises winding the bonded glass fiber mats into a cylindrical package at a winding torque progressively increased as the radius of the package increases to maintain the peripheral speed of the rotating cylinder substantially constant.

This mode of operation is attained by apparatus comprising a rotatably mounted winding mandrel, motor means, a fluid pressure actuated clutch operatively connecting the motor means and the mandrel, a source of fluid pressure operatively connected to the clutch and means for cyclically increasing the fluid pressure applied to the clutch in such proportion to the increase in radius of the cylindrical package on the mandrel as to maintain the peripheral speed of the cylindrical package substantially constant.

Other objects and features which I believe to be characteristic of my invention are set forth with particularity in the appended claims. My invention itself, however, in both organization and manner of construction, together with further objects and advantages thereof, may be best understood by reference to the following description and the accompanying drawings, to wit:

Figure 1:
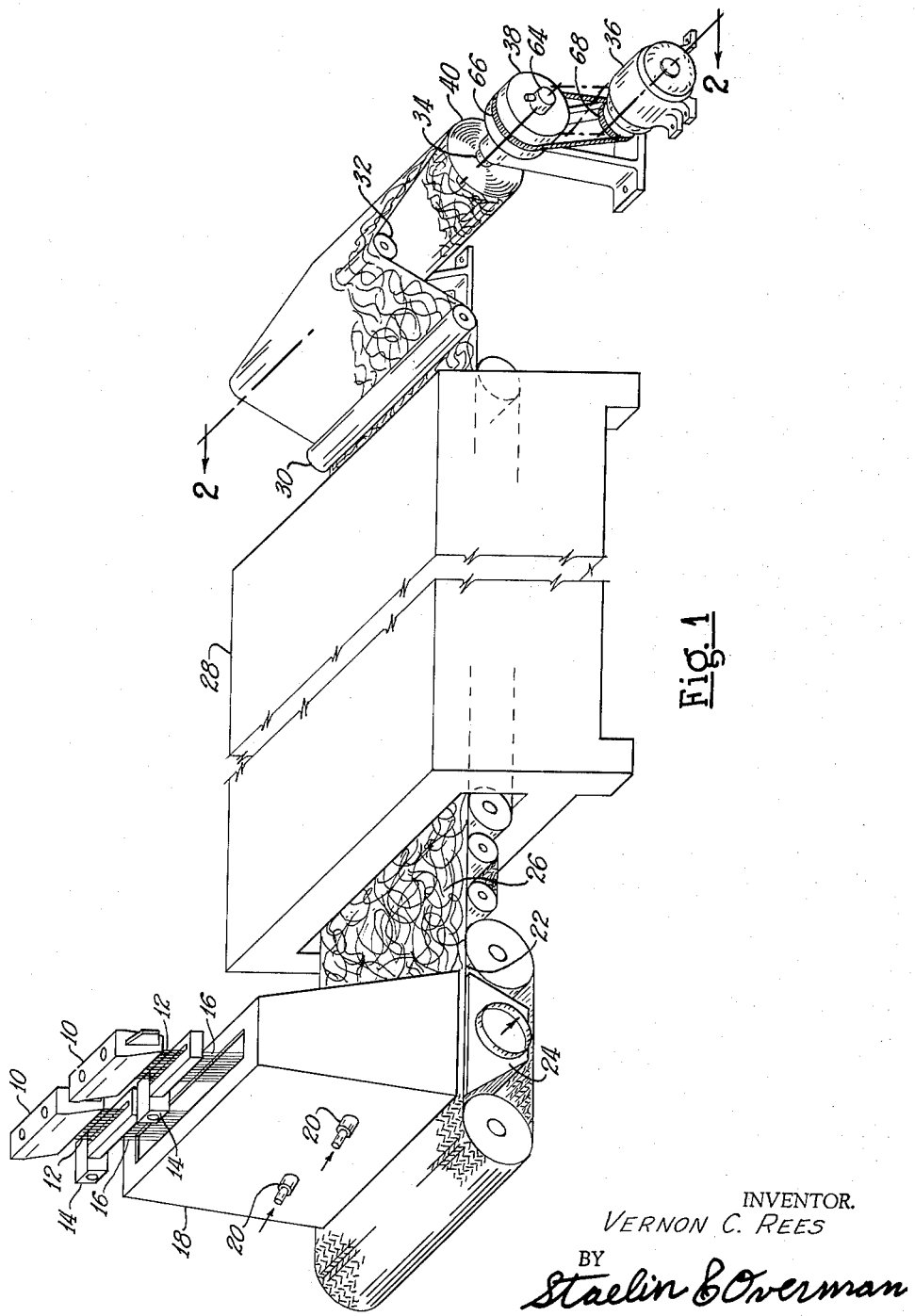
FIG. 1 is a diagrammatic perspective view of equipment employed in manufacturing continuous mats of glass fiber material bonded together with a suitable binder wherein the finished product is rolled up into a cylindrical package on a motor driven roll-up mandrel.

Referring to FIG. 1, there is shown a manufacturing line illustrating the typical steps in manufacturing continuous mats of glass fiber material bonded with a suitable binder. The finished manufactured product is largely employed in reinforcing various plastic compositions, such as polyesters, epoxy resins, phenolic resins, melamines, silicones, polystyrenes, etc. Typically, the bonded mat, as the material is referred to commercially, is positioned in a forming mold and the plastic to be reinforced is caused to flow or otherwise completely surround the individual fibers and assume the shape or contour of the mold.

As illustrated in FIG. 1, a molten glass composition is supplied from a refractory furnace (not shown) to bushings or feeders 10 associated therewith from which a plurality of streams 12 of glass are emitted from orifices in the feeder tips. High pressure gas jets or blowers 14 are disposed beneath the orifices in the feeder tips to attenuate the molten streams 12 of glass into fibers or filaments 16. The fibers 16 are blown into a forming hood 18 wherein the fibers are sprayed with a binder, such as a phenolic resin, by suitably disposed binder guns 20 located in the side wall of the forming hood. The fibers 16 are collected on a moving collecting surface 22 by a suction suitably created within suction box or chamber 24. The moving collecting surface 22 typically consists of a plurality of closely spaced air pervious endless conveyor belts. The glass fibers coated with the binder and deposited on the collecting surfaces 22 assume the form of a continuous mat 26, the thickness of which is determined by the speed of the collecting surface 22 as it passes under the forming hood 18.

The glass fiber mat 26 is carried through an oven 28 wherein the binder applied thereto is dried, cured, or otherwise indurated depending on the specific type of binder employed. When the bonded mat material leaves the oven 28 it passes under a guide roller 30, over roller 32 and finally onto a winding mandrel 34. The mandrel 34 is driven by an electric motor 36 through a variable slip clutch mechanism 38 which is effective to modify the degree of slip in driving the mandrel as the cylindrical package 40 of bonded mat builds up so that the peripheral speed of the package remains substantially constant at all times during operation.

Figure 2:
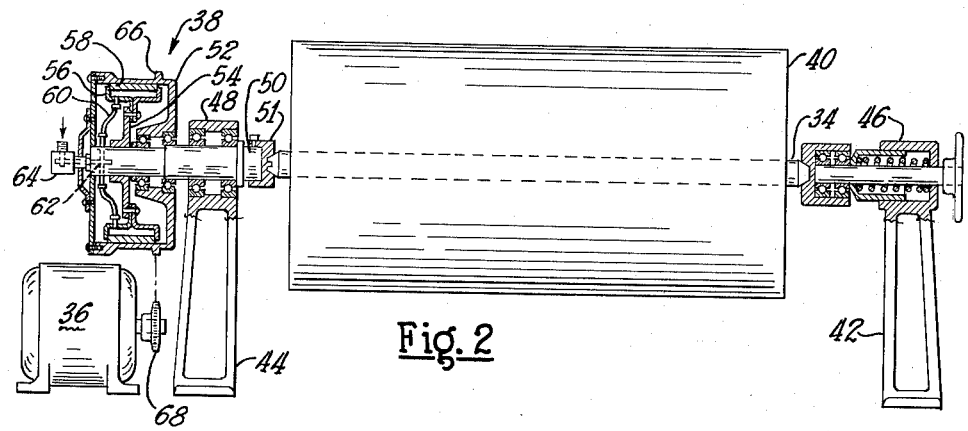
FIG. 2 is a sectional view of the roll-up apparatus taken along line 2—2 of FIG. 1.

FIG. 2 shows a sectional view of the clutch mechanism 38 and its associated mandrel 34. The opposite ends of the mandrel 34 are supported by spaced upstanding standards 42 and 44. The upper extended end portion of the standard 42 is provided with a spring biased bearing assembly 46 adapted to rotatably support one end of the mandrel 34. The upper extended end portion of the standard 44 is provided with a bearing assembly 48 for rotatably supporting a drive shaft 50 having at its inner end mandrel engaging key means 51.

The other end of the drive shaft 50 is connected to motor 36 by a selectively variable slip clutch assembly generally indicated by reference numeral 38. The clutch assembly 38 includes a generally cup-shaped outer housing 52 which is adapted to rotate freely with respect to the shaft 50, and an inner member 54 affixed to the shaft 50 and having a radially outwardly extending flange mounting an inflatable annulus 56 formed of a flexible air impervious material. The surface of the annulus 56 adjacent the inner surface of the cup-shaped housing 52 is provided with an integral strip of material 58 for selectively effecting frictional engagement with the inner peripheral surface of the cup-shaped housing 52.

The interior of the annulus 56 communicates with a source of pressure fluid through pipes or tubes 60, a central bore 62 in the outer end of the drive shaft 50, and an outer coupling 64.

The external peripheral surface of the cup-shaped housing 52 has a ring of radially outwardly extending teeth 66 formed thereon which are adapted to engage suitable drive means, such as a chain, driven by sprocket 68 affixed to the shaft of the motor 36. It will be appreciated that when pressure fluid is admitted to the interior of the annulus 56, the frictional material 58 is caused to engage the inner surface of the outer housing 52 thereby effecting rotation of the inner member 54 and imparting rotational movement to the drive shaft 50 and its associated mandrel engaging key means. Thus, rotational movement is imparted to the mandrel causing the bonded mat material 26 to be wrapped therefrom into a package 40.

Figure 3:
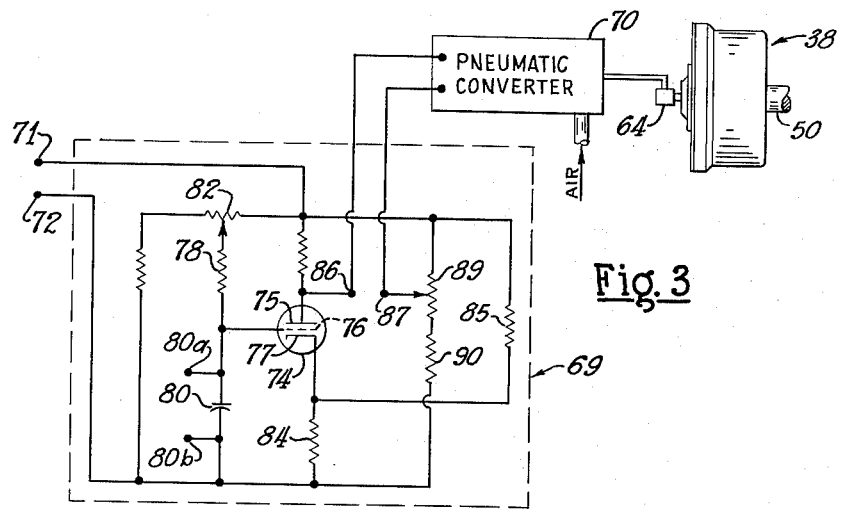
FIG. 3 is a circuit diagram of an electronic programmer effective to control the degree of slippage of a clutch mechanism interposed between the roll-up mandrel and the drive motor therefor.

As the package of material 26 builds up and its radius becomes larger, the peripheral speed of the package 40 must be maintained substantially constant to avoid any stretching, wrinkling, undue compressing or other deformation of the material being wrapped. Accordingly, as the build-up of the package 40 occurs, the revolutions per unit of time of the mandrel 34 must be reduced proportionally but the work required to rotate the package will increase. To accomplish the desired objectives, the fluid pressure admitted to the annulus 56 is selectively controlled or monitored by a pneumatic converter 70 connected to a source of pressure fluid. The arrangement is illustrated in FIG. 3 wherein it will be seen that the pneumatic converter 70 is controlled electronically by an automatic programming means, such as a ramp function generator circuit 69. It has been found that a pneumatic converter manufactured and sold by Leeds and Northrup (catalog No. 10970) achieves satisfactory results. Basically, the pneumatic converter 70 determines the amount of fluid pressure admitted to the annulus 56 to control the pressure of the strip 58 against the inner surface of the outer housing 52 thereby determining the clutch output torque applied to drive the mandrel 34.

The ramp function generator circuit 69 includes a set of input terminals 71 and 72 which may typically be coupled to a source of D.C. potential. The potential is supplied to a high impedance, three element vacuum tube 74 such as an RCA Nuvist or type 7586VT, having a plate 75, a grid 76, and a cathode 77. An adjustable R-C network, consisting of a resistor 78, a capacitor 80, and a potentiometer 82, is connected across the potential supply. The grid 76 of the vacuum tube 74 is connected to a point between the resistor 78 and the capacitor 80. The bias across the tube 74 is established by a voltage divider network consisting of resistors 84 and 85. The output of the circuit is sensed across output terminals 86 and 87.

At the beginning of a packaging cycle of the apparatus thus far described, the leading edge portion of the bonded mat material 26 is manually wrapped on the mandrel 34 which has its ends suitably positioned between the spaced upright standards 42 and 44.

The circuit of FIG. 3 is then energized by closing a switch, for example, in the power supply (not shown) which impresses a voltage across the R-C network (resistor 78 and capacitor 80), the tube 74, and the voltage divider network (resistors 84 and 85). At this stage, a charging current is caused to flow, causing the capacitor 80 to commence charging. As the charge on the capacitor 80 increases, the grid 76 of the tube 74 is rendered more positive with respect to the cathode 77, thereby effecting an increase of cathode-plate conduction through the tube. As the conduction through the tube increases, a proportionally increasing current signal will appear across the output terminals 86 and 87 which, in turn, is fed to and causes the pneumatic converter 70 to commence the admission of the pressure fluid to the clutch assembly 38. As the fluid pressure is admitted to the clutch assembly 38, a frictional driving coupling is effected between the outer housing 52 and the inner member 54 which is keyed to the drive shaft 50 of the mandrel. Initially, there is a certain degree of slippage which occurs between the outer housing 52 and the inner member 54.

As pointed out earlier in the description, it is necessary to maintain a substantially constant peripheral speed of the outer surface of the package 40 as it builds up in size. In order to achieve this objective, it becomes necessary to reduce the speed of the mandrel 34 as the package 40 builds up due to an increasingly larger package diameter. However, as the package 40 becomes larger, the work required to rotate the increasingly more loaded and thus heavier package becomes increasingly greater. Therefore, the output torque of the clutch 38 must increase in such proportion to the package radius build-up as to maintain the peripheral speed of the package constant.

Accordingly, as the capacitor 80 of the ramp function circuit continues charging, the grid 76 becomes increasingly more positive with respect to the cathode 77 causing a proportionally larger signal to appear at the output terminals 86 and 87. This increasingly larger signal causes the pneumatic converter 70 to admit increasingly more pressure fluid to the clutch assembly 38, causing a corresponding increase in the clutch output torque as illustrated in FIG. 4.

Figure 4:
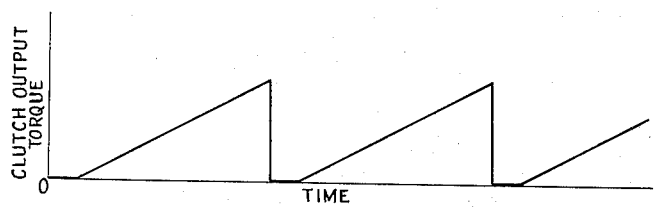
FIG. 4 is a graph of the clutch output torque of the clutch driving the roll-up mandrel against time.

FIG. 4 shows the relation of the clutch output torque compared to time. When the package 40 has reached the desired size, it is desired that the system be stopped so that the completed package may be removed from the mandrel 34 and a new package may be started. The package build-up may be sensed automatically by an appropriate externally positioned limit switch which may typically be in a circuit connected across the terminals 80a and 80b of the capacitor 80. Accordingly, when the switch of the external circuit connected to the terminals 80a and 80b is closed, the capacitor 80 will be discharged through the circuit. When the capacitor 80 discharges, the pneumatic converter 70 is caused to release the fluid pressure in the clutch assembly since no signal will appear across the output terminals of the ramp function generator. Typically, the time for a complete cycle is in the order of 7 to 14 minutes. The charging rate of the capacitor 80 is determined by varying the value of the voltage applied to the R-C network. The variable resistance 82 which may be a potentiometer, is employed to adjust the charging cycle of the circuit.

A voltage divider network including a variable resistor 89 and a fixed resistor 90 may be employed to establish a zero voltage at the start of each cycle of operation.

Figure 5:
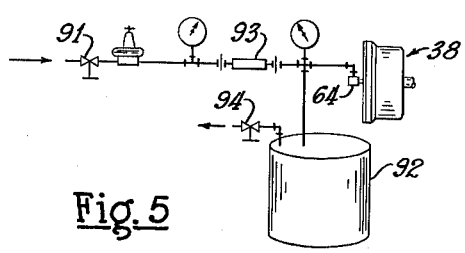
FIG. 5 is a diagrammatic illustration of a pneumatic programming system for controlling the degree of slippage of the clutch mechanism illustrated in FIG. 2.

FIG. 5 illustrates a pneumatic ramp function generator for achieving the desired objectives of the invention and could be substituted for the ramp function generator circuit 69 and the pneumatic converter 70 of FIG. 3. The pneumatic system is connected to the coupling 64 of the clutch assembly 38. Pressure fluid is admitted to the system from a reservoir through an inlet valve 91 and is delivered to an accumulator tank 92 through an orifice 93. As the pressure increases in the accumulator 92, a corresponding increase in pressure occurs at the coupling 64 of the clutch assembly 38 causing a corresponding increase in the output torque thereof. The pressure in the system will continue to increase until a predetermined maximum pressure is reached at which point the valve 94 in the accumulator 92 will be opened, either manually or automatically, causing a rapid decrease in the pressure of the system. Manifestly, this pressure decrease will affect the output torque of the clutch 38 in the same manner as the rapid discharge of the capacitor 80 in the ramp function generator circuit 69 of FIG. 3.

It has been found in practice with the use of the system considerably longer continuous mats of the bonded glass fiber material may be rolled up in a single package. This is due to the constant tensioning system and the consequent militation against the "telescoping" of the material which occurred in the systems employed in the past.

Also, it is to be noted that a magnetic type clutch could be successfully employed in lieu of the pneumatic type clutch described.

It will be appreciated that although the above description has been directed to the wind-up portion of a packaging system, by reversing the ramp function of the described systems the invention could be employed in controlling a pay-off operation.

In view of the foregoing, it will be understood that while I have shown certain particular forms of my invention, I do not wish to be limited thereto since many modifications may be made within the concept of the invention and I, therefore, contemplate by the appended claims to cover all modifications which fall within the spirit and scope of my invention.

I claim:
1. Drive means for a cylindrical web packaging device comprising:
   a rotatably mounted mandrel;
   motor means;
   a pressure fluid actuated clutch operatively connecting said motor means and said mandrel, said clutch including an expansible chamber means forming a part thereof and having a pressure fluid inlet;
   a source of pressure fluid;
   conduit means having one end connected to said source of pressure fluid and the other end connected to the expansible chamber means through the pressure fluid inlet of said clutch; and
   an automatic programming means independent of said rotatably mounted mandrel for cyclically varying the amount of pressure fluid admitted to the expansible chamber means of said clutch in proportion to the increase in radius of the cylindrical package on said mandrel so as to maintain the peripheral speed of said cylindrical package substantially constant.

2. The invention defined in claim 1 wherein said automatic programming means includes an electrical circuit means for producing an electrical signal proportional to the amount of pressure fluid to be admitted to the expansible chamber means of said clutch.

3. The invention defined in claim 1 wherein said automatic programming means includes a pressure fluid accumulator means.

References Cited by the Examiner
UNITED STATES PATENTS

| | | | |
|---|---|---|---|
| 1,857,780 | 5/32 | Frappier et al. | 242—75.5 X |
| 2,469,004 | 5/49 | Rosebrough | 242—75.53 |
| 2,563,660 | 8/51 | Rebut et al. | 242—75.53 |
| 2,651,257 | 9/53 | Thomas et al. | 242—75.5 X |
| 2,694,300 | 11/54 | Cherigie | 242—75.5 X |
| 2,869,481 | 1/59 | Chandler | 242—75.5 X |
| 2,967,025 | 1/61 | Aronson et al. | 242—75.5 |
| 2,978,200 | 4/61 | Larson et al. | 242—75.51 |

MERVIN STEIN, *Primary Examiner.*
RUSSELL C. MADER, *Examiner.*